Sept. 11, 1962   M. PETTY   3,053,722
RIB FORMING METHOD
Filed June 8, 1959
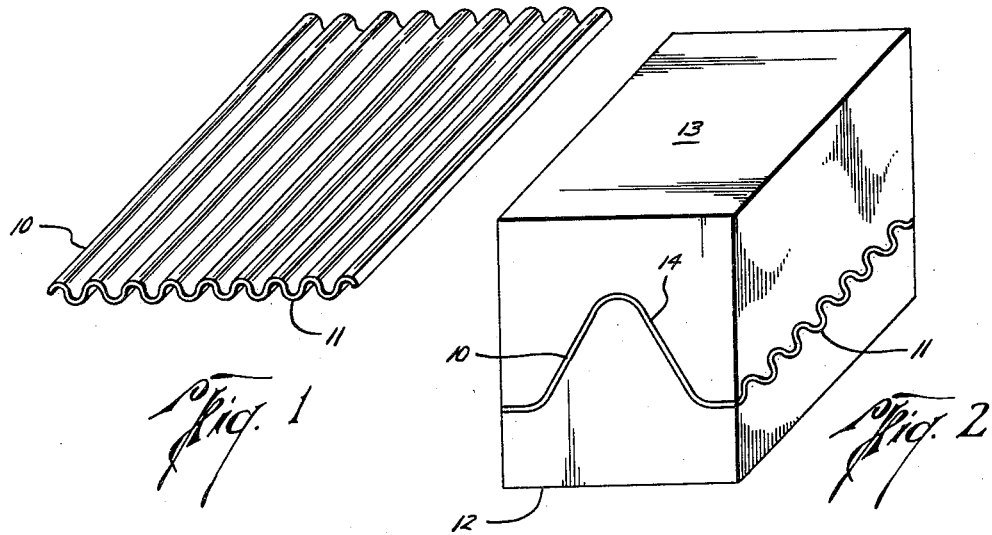
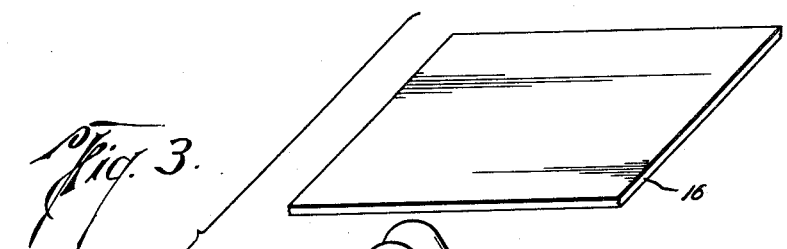
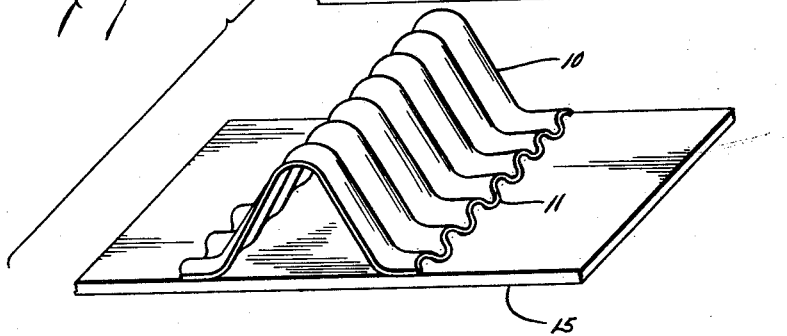
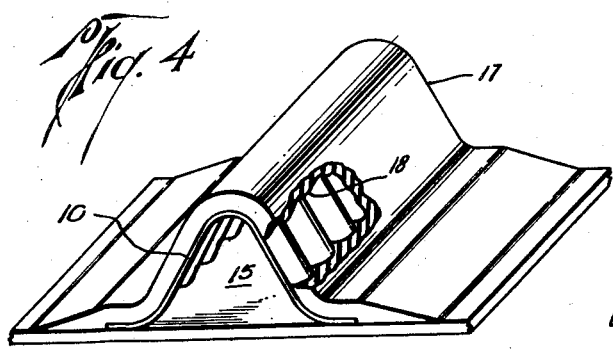
Macon Petty
INVENTOR.
BY
ATTORNEYS 3,053,722
RIB FORMING METHOD
Macon Petty, Houston, Tex., assignor to Hudson Engineering Corporation, Houston, Tex., a corporation of Texas
Filed June 8, 1959, Ser. No. 818,696
6 Claims. (Cl. 156—210)

This invention relates to an improved method of forming a rib upon a base of reinforced plastic material or the like.

Many reinforced plastic structures require reinforcing ribs and, in the past, these ribs have been formed from the same material as the base structure or a reinforced plastic material weldable to it. It is not practical merely to preform the ribs and then weld them to the base structure, because the ribs will lose their shapes as they are heated to curing temperature.

So, it has been the practice to dispose a flexible layer of material over a support on the base structure and having a shape corresponding to that of the rib to be formed. The edges of the layer overlap to extend beyond those of the support so that the layer may be molded to the support and its edges welded to the base structure on opposite sides of the support to form the rib.

Although balsa wood, styrofoam and other materials from which these supports have been formed are light, they are still heavier than air and thus add unnecessary weight to the over-all structure. Also it is expensive to form these bulky materials to the shape of support desired, particularly when the base is other than flat. Still further, such materials are porous and will soak up the plastic material of the rib. Since the support has served its function after the rib is formed, the use and formation of such materials into the desired shape is an expensive source of waste, particularly when the support cannot be readily removed after formation of the rib.

An object of this invention is to provide such a method in which the weight added to the over-all structure may be reduced.

Another object is to provide a method of forming such a rib which reduces the cost of materials as well as the time and labor involved.

A further object is to provide a method of this general type which facilitates the formation of ribs on base structures having intricate shapes.

Still another object is to provide such a method which facilitates the formation of stronger ribs.

These and other objects are accomplished, in accordance with the present invention, by a method which employs, as a support for the layer of reinforced plastic material, a thin sheet of material bent into a substantially rigid arch having the general shape of the rib to be formed. This sheet is disposed over the base structure with the arch spaced above it so that the layer may be molded to the outer surface of the sheet and its edges welded to the base adjacent the edges of the sheet.

Obviously, the resulting air space beneath the arch greatly reduces the weight added to the over-all structure. Also, it may be utilized as a duct for gases or liquids. Furthermore, the use of the sheet not only reduces the material cost of the rib support, but also the time and cost of forming the support into the desired shape. This is particularly true when the sheet is metal foil or other flexible material readily available on the market. In this case, the flexibility of the material permits the sheet first to be bent into an arch, and then the arch to be bent about its length into most any intricate shape the base structure may take.

In a preferred form of the invention, the sheet is corrugated transversely of the arch so that, as the layer of reinforced plastic material is molded to it, similar corrugations are formed therein to thereby strengthen the rib. Also, the corrugations in the sheet enable it to be bent longitudinally about intricate shapes, such as cylindrical fan rings, without crimping or stretching.

In the drawings, wherein like reference characters are used throughout to designate like parts:

FIG. 1 is a perspective view of a sheet of corrugated metal foil or the like for use as a support in practicing the method of this invention;

FIG. 2 is a perspective view of the sheet of FIG. 1 bent into a desired shape between a pair of mold members;

FIG. 3 is an exploded perspective view of the bent sheet or support positioned over a base structure and a layer of reinforcing material for disposal over the support in forming the rib; and FIG. 4 is a perspective view of the rib formed on the base structure, and with part of such rib broken away to illustrate the corrugations on its inner surface.

Turning now to a detailed description of the drawings, the sheet 10 may have the corrugations 11 preformed therein, or it may be obtained in flat form and such corrugations then formed in any well known manner. For that matter, the sheet may be flat when bent into arched shape, in the manner described hereinafter, although a corrugated sheet is preferred for the reasons noted above. In any case, at this stage of the process, the sheet is unbent in at least one direction, which would be transverse to the corrugations in the sheet illustrated.

Although it is preferred that this sheet material be metal foil, particularly aluminum because of its light weight and low cost as well as its flexibility for bending into a substantially rigid arch, it may be substantially rigid paper or sheet plastic material having many of the same characteristics. In any case, however, the material of the sheet 10 should have a higher melting point than the curing temperature of the reinforced plastic material from which the rib is formed such that it will maintain its shape during the molding process. Also, it is preferred that the sheet be of a material which is non-porous insofar as the rib material is concerned.

As shown in FIG. 2, the sheet 10 is disposed between a lower male mold member 12 and an upper female mold member 13 having adjacent faces which are moved into mating relation to bend an intermediate lateral portion of the sheet into an arch 14. More particularly, these mating faces are of such configuration as to form an arch having the general shape of the rib to be formed. Obviously, the use of the materials above-mentioned enables the sheet to be bent with a minimum of effort and to be substantially rigid when so formed. These mating faces of the mold members may be corrugated similarly to the sheet 10, as shown, or they may be substantially flat in a longitudinal direction. In the latter case, the mold members would be moved toward one another only a distance sufficient to form the arch in the sheet, without completely flattening out the corrugations.

Upon removal from between the mold members 12 and 13, the bent sheet 10 is placed upon a base structure 15 of reinforced plastic material or the like. More particularly, the bent sheet or supprt is placed along the desired location of the rib on the base structure and with the arch 14 spaced above it to form a void longitudinally thereof. Although the base structure is shown in the drawings to be flat, it obviously may be curved, undulating, or have sharp corners, particularly in a direction longitudinally of the sheet. In such a case, the corrugations would enable the sheet to have a maximum amount of flexibility in a longitudinal direction so as to facilitate conformity with the configuration of the base structure.

The layer 16 of reinforcing material may be impregnated with a suitable liquid resin and the resulting flexible layer of reinforced plastic material then laid over the support, with its edges overlapping those of the sheet 10. Alternatively, the resin may be coated or sprayed onto the support in overlapping relation to its edges, the layer 16 then laid thereon, and another coat of resin applied to the reinforcing material to form a flexible layer of reinforced plastic material. In either case, the flexible layer will substantially conform to the upper surface of the sheet 10 and, as the plastic material is cured and caused to harden, such layer will be molded to the sheet and its edges welded to the base structure at opposite sides of the edges of the sheet to form the rib 17.

Alternatively, a preformed flexible layer of unset reinforced plastic material may be used. In this case, the layer would be laid over the support and its edges worked into the base structure adjacent the edges of the sheet prior to curing. On the other hand, the flexible layer may be made up on the job by disposing a layer 16 of Fiberglas or other suitable reinforcement between two sheets of soft plastic, and then working the resulting sandwich with rollers or the like to thoroughly impregnate the reinforcement with the plastic material, either before or after disposal over the support.

In the sense that it is used herein, the term "welding" means the curing together of the material of the base structure 15 and the resin with which the layer 16 is impregnated. Such curing may involve the addition of heat or it may occur at room temperature, in which case curing might be accelerated by heating.

When the rib 17 is so formed, its inner surface will conform to the corrugations 11 in the upper surface of the sheet 10 and the outer surface thereof will be substantially smooth and gradually tapered off along its edges at its joinder with the base structure 15. The corrugations 18 so formed on the inner surface of the rib 17 lend additional strength to it.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A method of forming a rib upon a base of reinforced plastic material, comprising the steps of bending a thin sheet of material into a substantially rigid arch having the general shape of the rib to be formed, disposing the sheet over the base along the desired location of the rib and with the arch spaced about it, disposing a flexible layer of reinforced plastic material which is weldable to the base material over the sheet and with its lateral edges overlapping those of the sheet, and curing the layer to mold it to the sheet and weld its edges to the base.

2. A method of the character defined in claim 1, wherein the sheet is corrugated transversely of the arch.

3. A method of forming a rib upon a base of reinforced plastic material, comprising the steps of disposing a thin sheet of material having a substantially rigid arch with the general shape of the rib to be formed over the base along the desired location of the rib and with the arch spaced above it, covering the sheet so disposed with a flexible layer of unset reinforced plastic material so that its lateral edges extend beyond those of the sheet, and curing the layer to mold it to the sheet while welding its edges to the base adjacent the edges of the sheet.

4. A method of the character defined in claim 3, wherein the sheet is impervious to the reinforced plastic material.

5. A method of character defined in claim 3, wherein the sheet has a higher melting point than the curing temperature of the rib material.

6. A method of the character defined in claim 3, wherein the sheet metal is foil.

References Cited in the file of this patent

UNITED STATES PATENTS

| | | |
|---|---|---|
| 1,901,864 | Bellanca | Mar. 21, 1933 |
| 2,124,854 | Guinzburg | July 26, 1938 |
| 2,371,754 | Gillum et al. | Mar. 20, 1945 |
| 2,850,083 | Frost | Sept. 2, 1958 |